United States Patent
Holtzman

(10) Patent No.: US 9,163,919 B2
(45) Date of Patent: Oct. 20, 2015

(54) GOLF CLUB GAUGE

(71) Applicant: Barry Lyn Holtzman, Eagle River, WI (US)

(72) Inventor: Barry Lyn Holtzman, Eagle River, WI (US)

( * ) Notice: Subject to any disclaimer, the term of this patent is extended or adjusted under 35 U.S.C. 154(b) by 189 days.

(21) Appl. No.: 13/986,741

(22) Filed: May 31, 2013

(65) Prior Publication Data
US 2014/0352162 A1    Dec. 4, 2014

(51) Int. Cl.
*G01C 9/06* (2006.01)
*G01B 5/00* (2006.01)
*A63B 53/02* (2015.01)
*A63B 59/00* (2015.01)

(52) U.S. Cl.
CPC ............. *G01B 5/0023* (2013.01); *A63B 53/02* (2013.01); *A63B 59/0074* (2013.01); *A63B 2220/16* (2013.01)

(58) Field of Classification Search
CPC ........ G01C 9/016; G01B 5/0023; G01B 5/24; A63B 53/02; A63B 59/0074; A63B 2220/16
USPC ............. 33/508, 366.11, 366.15, 366.24, 640
See application file for complete search history.

(56) References Cited

U.S. PATENT DOCUMENTS

| 2,546,426 | A | | 3/1951 | Bryant | |
|---|---|---|---|---|---|
| 4,245,392 | A | * | 1/1981 | Heller | 33/508 |
| 4,817,294 | A | * | 4/1989 | Lai | 33/508 |
| 4,858,332 | A | * | 8/1989 | Thomas | 33/508 |
| 4,928,397 | A | * | 5/1990 | Wang | 33/508 |
| 5,105,550 | A | | 4/1992 | Shenoha | |
| 6,363,620 | B1 | * | 4/2002 | Goodjohn | 33/508 |
| 6,430,829 | B1 | * | 8/2002 | Williamson et al. | 33/508 |
| 6,449,860 | B1 | * | 9/2002 | Nakai | 33/508 |
| 6,508,007 | B1 | * | 1/2003 | Muldoon | 33/508 |
| 7,010,965 | B2 | * | 3/2006 | Cameron | 73/65.03 |
| 7,164,473 | B2 | * | 1/2007 | Goodjohn | 356/139.04 |
| 2007/0056179 | A1 | * | 3/2007 | Beall | 33/640 |

OTHER PUBLICATIONS

Golfwrx.com "Making a loft gauge at home"; Feb. 13, 2010; http://www.golfwrx.com/forums/topic/343390-making-a-loft-gauge-at-home/.*
Auditor "Budget Lie & Loft Measuring Gauge"; http://www.golfshaftsasia.com/clubmakingtools/golf-mechanix/Budget-Lie-and-Loft-Measuring-Gauge.php.*
The Golf Works "Magnetic Protractor"; http://www.golfworks.com/product.asp_Q_pn_E_PRO_A_cn_E_1894.*
The Golf Works "Maltby Golf Club Gauge"; http://www.golfworks.com/product.asp_Q_pn_E_GW1040.*

* cited by examiner

*Primary Examiner* — Joshua Kennedy

(57) ABSTRACT

A golf club gauge includes a frame, a clamping means, and a hand-held electronic level which can be zeroed to establish a reference plane. The level is positioned relative to a reference surface of the frame and relative to a surface to be measured, and using information obtained in these two positions, the level is used to square a head in the frame and also to measure the head's loft, lie, and face angles. An attachment is provided for the level which improves accuracy when it is used on heads with arcuate faces.

19 Claims, 5 Drawing Sheets

GOLF CLUB GAUGE

CROSS REFERENCE TO RELATED APPLICATIONS

Not Applicable

FEDERALLY SPONSORED RESEARCH OR DEVELOPMENT

Not Applicable

SEQUENCE LISTING, TABLE, OR PROGRAM

Not Applicable

BACKGROUND

1. Field

Figure 1:
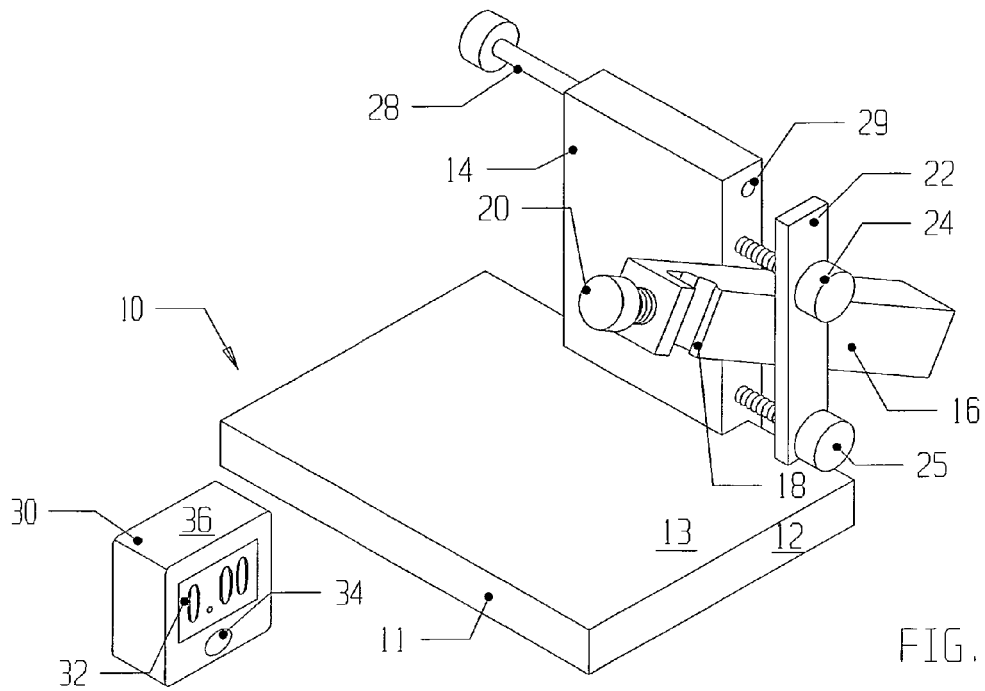

This application relates to a golf club gauge which measures properties of a golf club head, the gauge using a level in its head squaring and measuring systems.

2. Prior Art

Golf club heads have important properties such as loft angle, lie angle, and face angle which are measured with a tool commonly called a golf club gauge. Golf club heads have a face for hopefully striking a golf ball, a tubular extension called a hosel in which a shaft can be secured, a sole on which the head rests when placed on the ground, a toe which is its end away from the golfer, and a heel which is its end toward the golfer. Most irons and wedges have faces which are flat, while most drivers, fairway woods, and hybrids have faces which are not flat but arcuate. A vertical arc on an arcuate face is called roll, a horizontal arc is called bulge.

Measurements of a head's properties are normally taken with the head in a centered, squared, position, or CSP. For a club head to be in its CSP, several conditions together must be met. With the club's hosel/shaft axis lying in a shaft plane which is perpendicular to a ground plane, the centered condition is met if the head's sole touches the ground plane at a point which is centered on the head's face. The squared condition is met if the head's face line, a line defined by two points on the face equally distant horizontally from the face's center and halfway up the face from the ground plane, is parallel to the shaft plane. When the head is in its CSP, loft angle is the angle the head's face makes with the shaft plane, lie angle is the angle the hosel/shaft axis makes with the ground plane, and face angle is the angle the face line makes with the shaft plane which is zero if the head is in its CSP.

Golf club gauges typically have a frame and a clamping means to secure a club head in positions relative to the frame. They also have a system for squaring the head in the frame and a measuring system to obtain the head's loft, lie, and face angles. A golf club gauge with novel squaring and measuring systems is the object of this Application.

Many current golf club gauges use protractor devices in their squaring and measuring systems, one such gauge being shown in U.S. Pat. No. 2,546,426 to Bryant (1951). Parts 78 and 80 measure the head's lie angle, and 116 and 118 measure its loft angle. Parts 132 and 134 are used to measure the head's face angle and also can be used to square the head in the gauge. These protractor devices must have a relatively large size for sufficient accuracy, resulting in a gauge which is relatively large. Also, there are numerous relatively complex parts, resulting in a gauge with relatively high cost.

A club gauge which uses levels in its measuring system is shown in U.S. Pat. No. 5,105,550 to Shenoha (1992). Two electronic levels are fixed to the gauge's frame, level 105 for measuring a head's loft angle and level 91 for measuring its lie angle, and this requirement for two levels increases the cost of this gauge over one which could function with only one level. FIG. 19 shows a slide assembly 95, a rail 93, and a horizontal plate 97 used to square the head's face, and a spirit level 101 used with level 91 to measure lie angle; these additional parts add further complexity and cost. FIG. 20 shows a protractor device 119 for measuring face angle, adding even more complexity and cost.

It is desirable to have a golf club gauge which uses a level in its head squaring and measuring systems, resulting in a low cost, compact gauge having few parts. It is also desirable that the level be hand-held and electronic with a zeroing function, allowing the gauge to be readily portable and usable in various orientations. Also desirable is an attachment for the level which prevents rocking when the level is placed relative to an arcuate club face.

SUMMARY

In accordance with one embodiment, a golf club gauge includes a frame, a clamping means, and a hand-held electronic level. The level is positioned relative to a reference surface of the frame and relative to a surface to be measured, and using information obtained in these two positions, the level is used to square a head in the frame and also to measure the head's loft, lie, and face angles. An attachment is provided for the level which improves accuracy when it is used on heads with arcuate faces.

DRAWINGS

Brief Description

Figure 2:
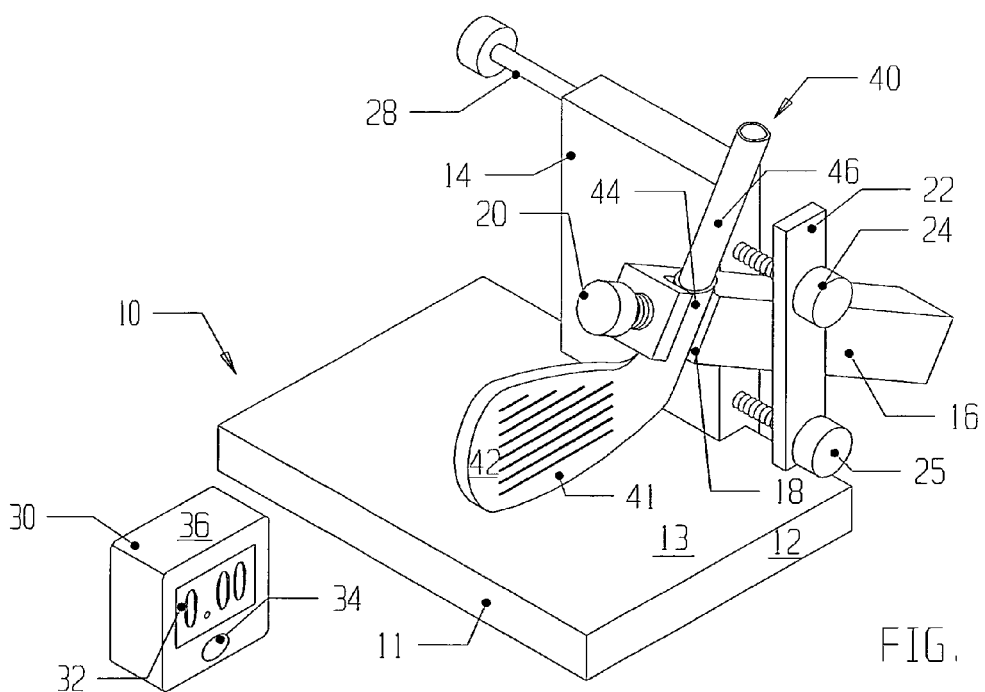

FIG. 1 shows an embodiment of a golf club gauge of this invention and FIG. 2 shows the gauge holding a golf club having a head to be measured.

Figure 3:
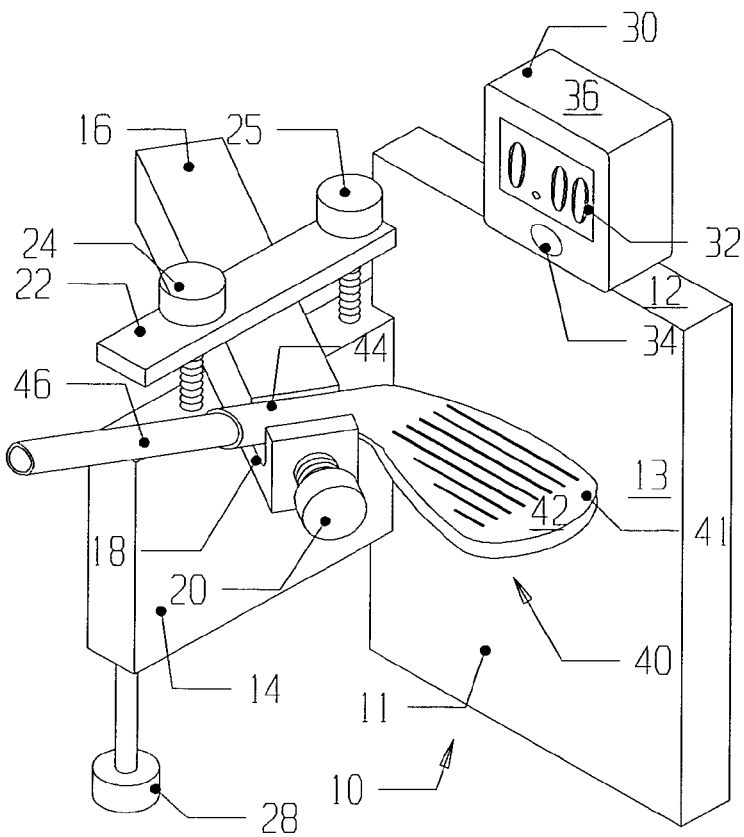
Figure 4:
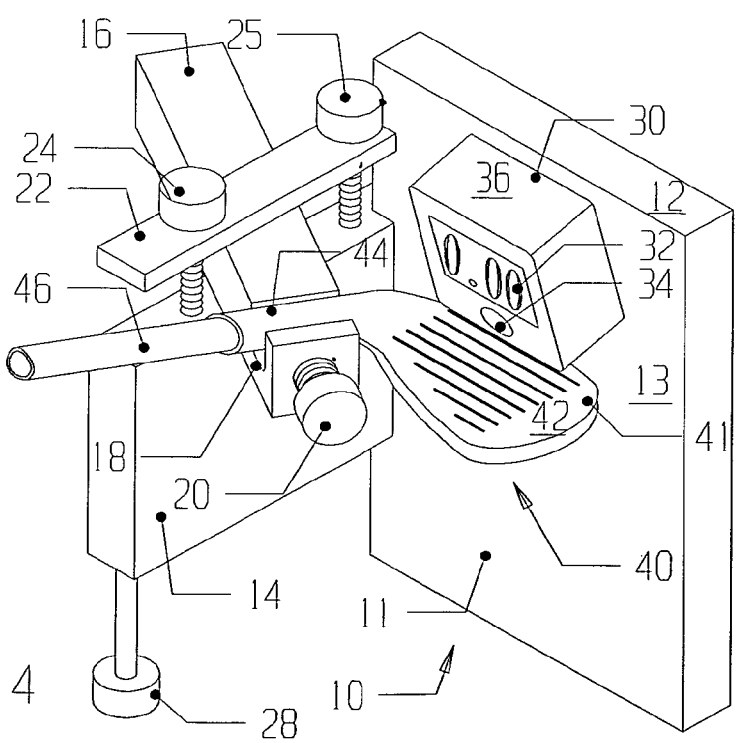
Figure 5:
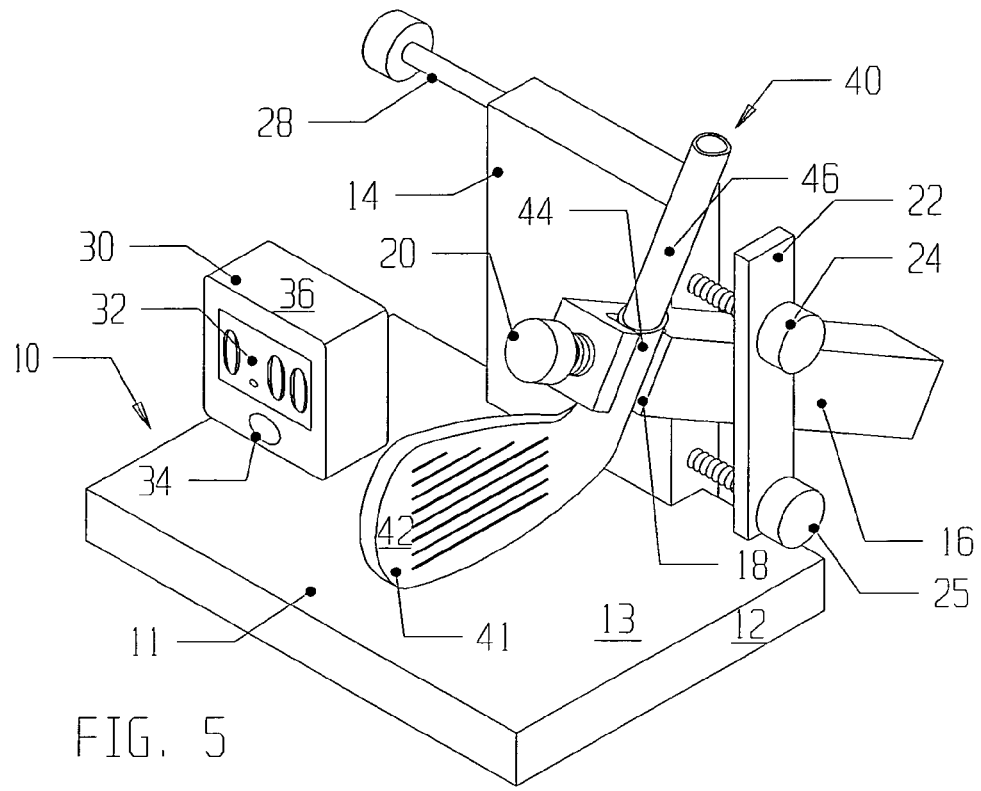
Figure 6:
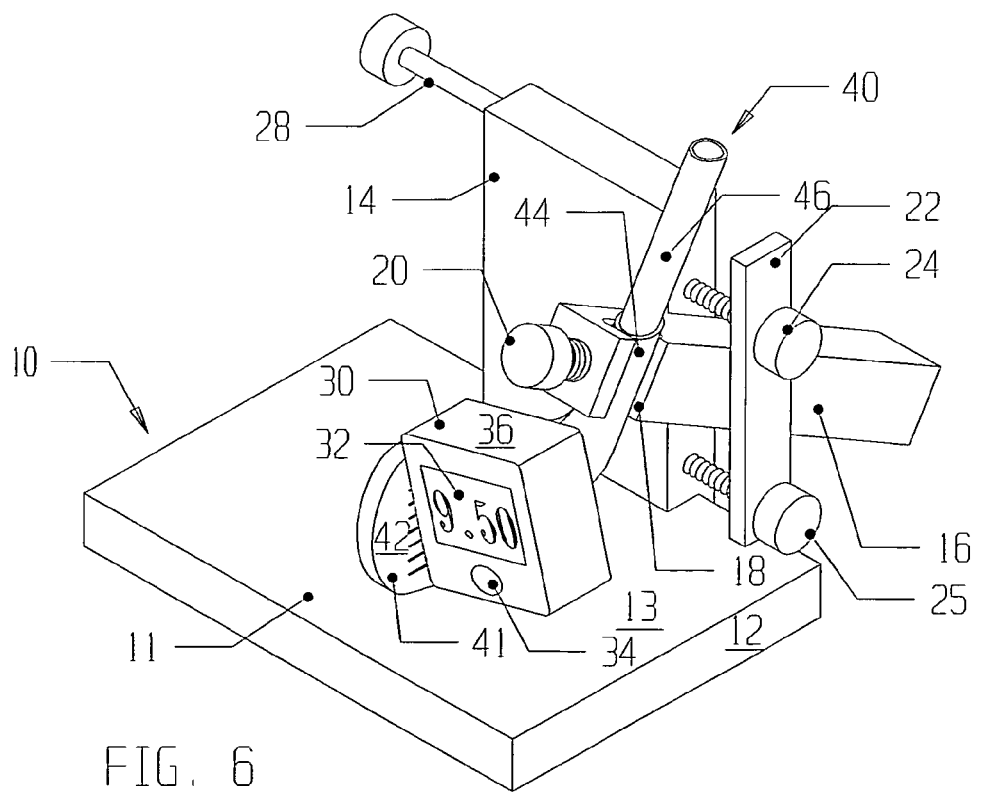
Figure 7:
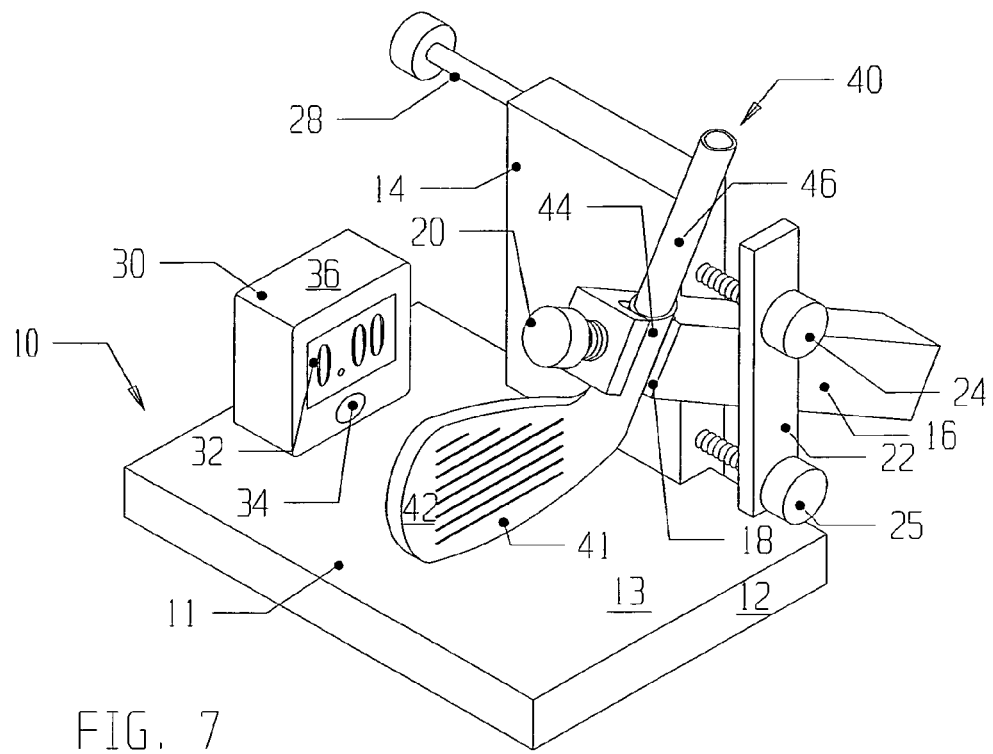
Figure 8:
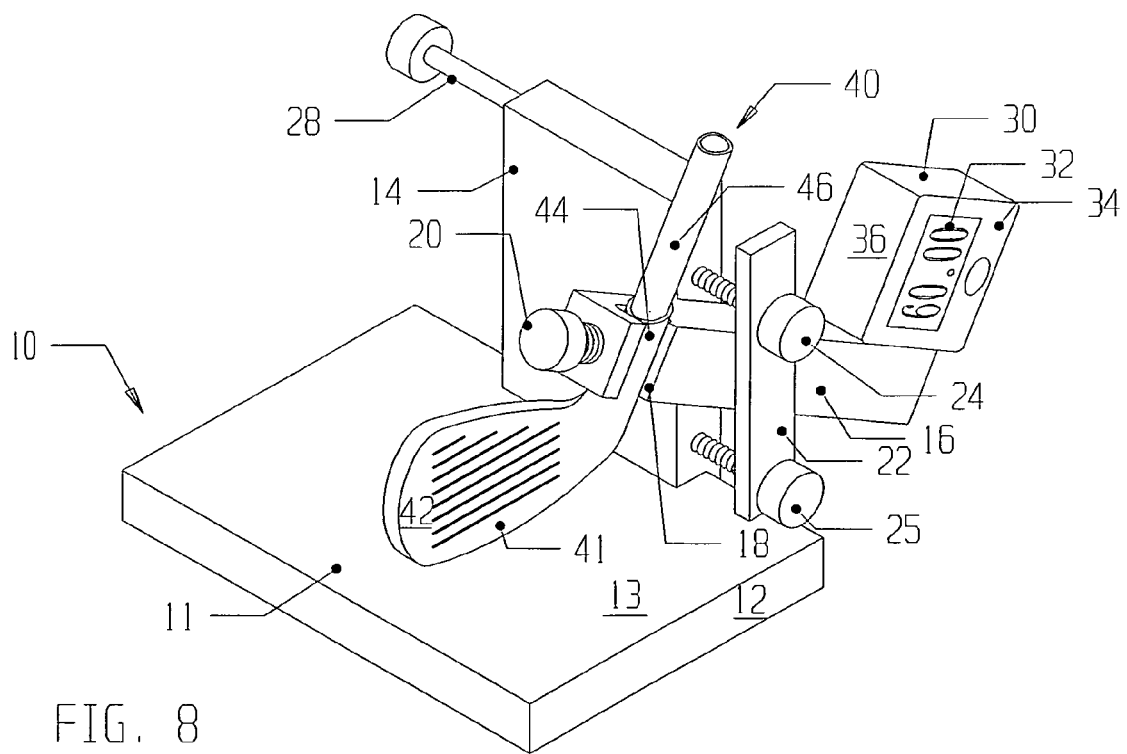

FIGS. 3 and 4 show the gauge's positions when squaring the club head or measuring its face angle, FIGS. 5 and 6 show gauge positions used to determine loft angle, and FIGS. 7 and 8 show positions used to measure lie angle.

Figure 9:
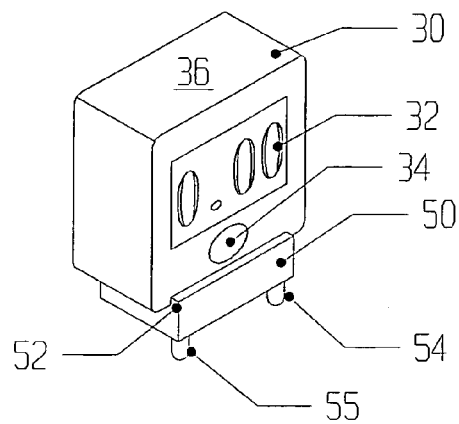
Figure 10:
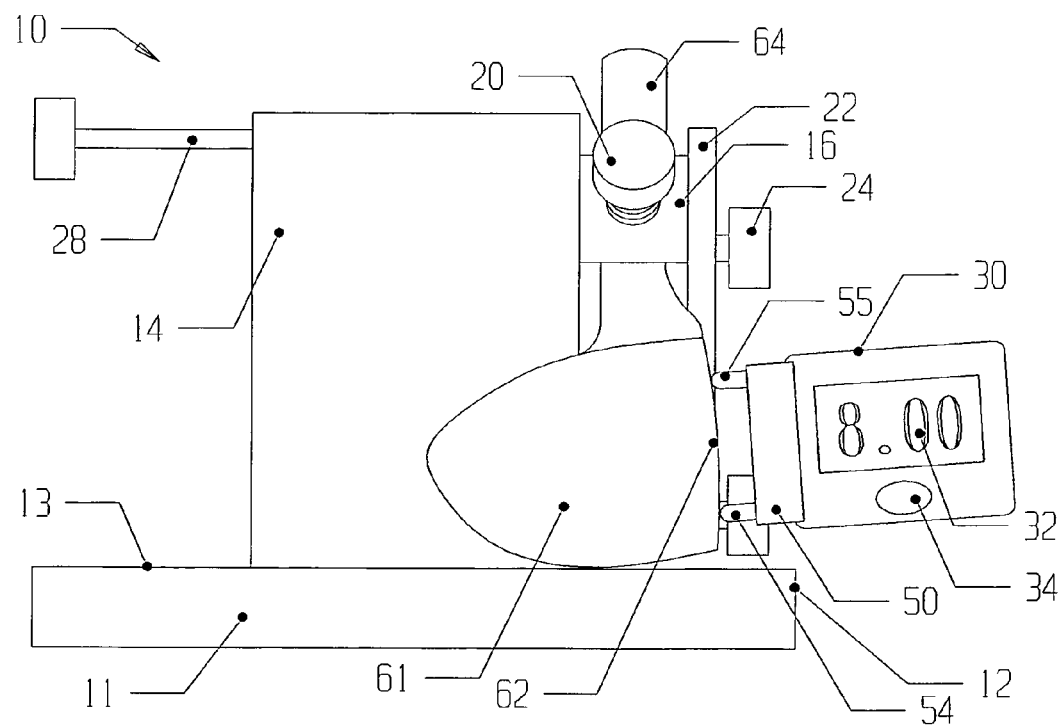

FIG. 9 shows an attachment which, when placed on a level, allows the level to accurately measure faces which are not flat, and FIG. 10 shows how this attachment is used to measure loft of one of these arcuate faces.

REFERENCE NUMERALS

10 frame and clamping assembly
11 frame's base plate
12 vertical plane reference surface
13 ground plane reference surface
14 frame's riser plate
16 clamp
18 clamp notch
20 clamp bolt
22 clamping bar
24 upper clamping bar screw
25 lower clamping bar screw
28 support leg
29 support leg alternate threaded hole
30 electronic level
32 digital readout
34 zeroing switch 36 level top measuring side
40 right-handed golf club assembly
41 right-handed golf club head
42 face
44 hosel
46 shaft
50 level attachment
52 attachment shoulder
54 first attachment projection
55 second attachment projection
61 head with arcuate face
62 arcuate face

DESCRIPTION

FIGS. 1 and 2—A Golf Club Gauge Embodiment

FIGS. 1 and 2 show an embodiment of a golf club gauge of this invention. The gauge has a frame and clamping assembly 10 with two frame members, a base plate 11 and a riser plate 14. The leading edge of base plate 11 is a vertical plane reference surface 12 and its top surface is a ground plane reference surface 13. A clamp 16 with a notch 18 and a bolt 20 is positioned at the near end of riser plate 14 and held there using a clamping bar 22, an upper clamping bar screw 24, and a lower clamping bar screw 25. A support leg 28 is secured to the far end of riser plate 14, on the end opposite clamp 16. In FIG. 1 an alternate support leg threaded hole 29 is shown for optional placement of leg 28 on the near end of riser plate 14. These figures also show an electronic level 30 having a front cover with a digital readout 32 and a zeroing switch 34. Level 30 has four orthogonal measuring sides, one of which is its top measuring side 36. FIG. 2 shows assembly 10 holding a right-handed golf club assembly 40 having a club head 41 with a face 42 and a hosel 44. An optional shaft 46 is shown secured in hosel 44.

FIGS. 1 and 2 show frame and clamping assembly 10 positioned so that vertical plane reference surface 12 is approximately vertical and ground plane reference surface 13 is approximately horizontal, and this position of assembly 10 is called its "loft and lie position". Reference surface 12 is described as being vertical and reference surface 13 is described as being a ground plane because of their relationship to head 41, not necessarily because of their relationship to the earth. This gauge is meant to be portable and usable in various orientations, and in some procedures discussed later, assembly 10 is positioned such that surface 12 will be approximately horizontal and surface 13 will be approximately vertical.

FIG. 2 shows hosel 44 of head 41 being held by clamp 16. Hosel 44 is placed in notch 18 and bolt 20 is tightened to restrict but not completely eliminate especially rotational movement of head 41. A preferred design of notch 18 also allows shaft 46 to be clamped if desired. Movement of clamp 16 relative to riser 14, both translational and rotational, is restricted, but again preferably not completely eliminated, by tightening upper and lower clamping bar screws 24 and 25 against clamping bar 22. Assembly 10 is designed such that, when club assembly 40 is clamped, its shaft plane, a plane which is perpendicular to surface 13 and contains the axis of hosel 44, is also parallel with surface 12.

With clamp 16 placed on the near end of riser 14 and support leg 28 placed on the far end as shown, assembly 10 is in a good configuration for measuring a right-handed golf club, club assembly 40. Preferably riser plate 14 has two vertical sets of holes for securing support leg 28 and screws 24 and 25, one set in its near end and another set in its far end. This allows clamp 16 and support leg 28 to be installed on either end of riser plate 14. If clamp 16 is placed on the far end of riser plate 14 and support leg 28 is placed on the near end in its alternate hole 29, then assembly 10 is in a good configuration for measuring left-handed heads. In this left-handed configuration, the back edge of base plate 11 which is opposite vertical plane reference surface 12 becomes the vertical plane reference surface.

Several levels available today would function in this gauge, but a level like electronic level 30 with its four orthogonal measuring sides and its handy zeroing function works exceptionally well. To zero level 30, a first measuring side of level 30 is positioned relative to a first surface and zeroing switch 34 is pressed, establishing the plane of the first measuring side so positioned as a reference plane. If the first measuring side of level 30 is then placed relative to a second surface, readout 32 indicates the angle between the reference plane and the plane of the first measuring side positioned relative to the second surface. Also, since the measuring sides of level 30 are orthogonal, if desired, a second measuring side of level 30 can be placed relative to the second surface. Digital readout 32 can still provide useful information, albeit readout 32 needs to be interpreted based on the angle between the first and second measuring sides.

Level 30 is used to obtain an angular relationship between a surface of assembly 10 which is used as a reference surface for level 30, such as reference surface 12 or 13, and a surface to be measured, such as, in the case of this embodiment, face 42 or clamp 16. Level 30 can be read when positioned relative to the reference surface of the frame and relative to the surface to be measured, and these two readings can be used to obtain the angular relationship between the two surfaces. Another procedure is to use the zeroing function of level 30 to obtain the angular relationship of the two surfaces, either by zeroing level 30 when positioned relative to the reference surface of the frame and then reading level 30 when positioned relative to the surface to be measured, or vice versa. In explaining the following measurement procedures, the zeroing function of level 30 is used to simplify the discussions and procedures.

FIGS. 3 and 4—CSP and Face Angle Measurement

As mentioned above, measurements on club head 41 are normally taken with head 41 in its CSP, and FIGS. 3 and 4 show how head 41 is placed in its CSP. In these figures, assembly 10 is shown in its right-handed configuration and in a position rotated approximately ninety degrees from the position shown in FIGS. 1 and 2. In this "squaring and face angle position" of assembly 10, the edge of base plate 11 which is opposite reference surface 12 and the end of support leg 28 rest on an approximately horizontal surface. Vertical plane reference surface 12 is therefore approximately horizontal facing upwardly and ground plane reference surface 13 is approximately vertical.

Head 41 is centered in assembly 10 by making the intersection of its sole with surface 13 occur in the center of face 42, accomplished by observing this intersection while making adjustment to the position of club assembly 40 in clamp 16 and/or to the position of clamp 16 relative to riser plate 14. Head 41 is squared in assembly 10 by making its face line parallel with surface 12 and thereby parallel with the shaft plane. If face 42 is flat, this can easily be accomplished with level 30, using surface 12 as the reference surface and face 42 as the surface to be measured. Since the gauge is meant to be portable, surface 12 may not be exactly horizontal. Therefore, level 30 is zeroed by placing one of its measuring sides, its bottom measuring side for instance, against surface 12 as shown in FIG. 3 and then pressing zeroing switch 34; this establishes reference surface 12 as a reference plane. Level 30 is then placed on face 42, preferably with a tilt as shown in FIG. 4, keeping the front and back edges of its bottom measuring side against face 42 and surface 13 respectively. Club assembly 40 is then rotated in clamp 16 until level 30 reads zero, placing the face line of head 41 parallel with surface 12 and therefore placing head 41 squarely in assembly 10. The intersection of the sole of head 41 with surface 13 is centered on face 42, head 41 is set squarely in assembly 10, and the axis of hosel 44 lies in a shaft plane which is perpendicular to ground plane reference surface 13, and thus head 41 is in its CSP.

Many club heads, especially iron and wedge heads, are designed to have square faces when in their design lie angle and with their soles centered and resting naturally on a ground plane; they are said to have zero face angle. But some heads have sole designs which result in a face angle which is intentionally not square when their soles are naturally resting on a ground plane. These non-square (non-zero) face angles are said to be open if the toe is rearward of its square position and closed if the toe is forward. In FIGS. 3 and 4, to measure a non-zero face angle, head 41 is still centered but instead of rotating it so its face 42 is in a square position, it is positioned so its sole sits naturally on surface 13. Level 30 is again zeroed on surface 12 as shown in FIG. 3 and then placed on face 42 as shown in FIG. 4. Digital readout 32 indicates the magnitude of the non-zero face angle, and it is open or closed depending on the positions of the toe and heel relative to surface 12.

If a club face is not flat but arcuate with a horizontal arc, if level 30 is placed on this face similarly to the placement shown in FIG. 4, the front edge of level 30 will make an approximately point contact with this bulged face and level 30 can rock. These face angle and squaring procedures can sometimes still be accomplished with sufficient accuracy by looking at the front edge of level 30 and the arcuate face, keeping the gap symmetrical on both sides of their intersection. But an attachment for level 30 discussed later prevents level 30 rocking when the surface to be measured is a bulged face, thereby improving accuracy of these squaring and face angle procedures.

FIGS. 5 and 6—Measuring Loft Angle

In FIGS. 5 and 6, a procedure for measuring loft angle is shown. Frame and clamping assembly 10 is back in its loft and lie angle position where reference surface 12 is approximately vertical and reference surface 13 is approximately horizontal and head 41 preferably is in its CSP. The reference surface is ground plane reference surface 13, and a measuring side of level 30, its bottom side for instance, is shown in FIG. 5 resting on surface 13. With its front cover perpendicular to reference surface 12, level 30 is zeroed by pressing switch 34, establishing a reference plane. The surface to be measured is face 42, and the left measuring side of level 30 is positioned thereon as shown in FIG. 6. Digital readout 32 in this position indicates the loft angle of face 42 with head 41 in its CSP. Optionally, if head 41 has an intentional non-zero face angle, a "loft at face angle" measurement can be made similarly to this procedure but with head 41 in its non-zero face angle position when the measurement is made.

When measuring loft on faces which are not flat but arcuate with a vertical arc, level 30 will rock when one of its measuring sides is placed on this rolled face. Loft can sometimes still be measured with sufficient accuracy by keeping the gap symmetrical on both sides of the intersection of the measuring side with the face's roll. But the attachment for level 30 discussed above will also prevent level 30 rocking when measuring loft angle on a face with roll, again improving accuracy when measuring loft angle of a rolled face.

FIGS. 7 and 8—Measuring Lie Angle

In FIGS. 7 and 8, frame and clamping assembly 10 is still in its loft and lie position where surface 13 is approximately horizontal and head 41 is preferably still in its CSP. The reference surface is again ground plane reference surface 13. FIG. 7 again shows the bottom measuring side of level 30 resting on surface 13 but in this case with its front cover parallel with surface 12 (instead of perpendicular with surface 12 when measuring loft angle). Level 30 is zeroed in this position, establishing a reference plane. The surface to be measured is the top side of clamp 16, and FIG. 8 shows the left measuring side of level 30 placed thereon. Digital readout 32 indicates the lie angle of club assembly 40.

FIGS. 9 and 10—Arcuate Surface Level Attachment

The four measuring sides of level 30, its top measuring side 36 for instance, are of course flat and, if placed on an arcuate face, level 30 can rock, making an accurate measurement difficult. FIG. 9 shows an attachment 50 placed on the bottom measuring side of level 30 which prevents this rocking. It is preferable that attachment 50 be easily attached and removed, thereby allowing its placement on any of the four measuring sides of level 30. Attachment 50 preferably has a shoulder 52 which allows it to easily be positioned parallel with the measuring side of level 30 against which it is placed. Attachment 50 has a first projection 54 and a second projection 55 which will touch an arcuate surface in two approximately point contacts, preventing rocking of level 30. Levels like electronic level 30 are available with magnets on one or more measuring sides, and if attachment 50 is made of a magnetic material such as mild steel, magnetic attraction is useful for holding attachment 50 on a measuring side of level 30.

FIG. 10 is a side view of assembly 10 showing how attachment 50 is used with level 30 when measuring loft on a head 61 with an arcuate, rolled face 62. Level 30, with or without attachment 50, is first placed on assembly 10 and zeroed as shown in FIG. 5. Then, with attachment 50 placed on the left measuring side of level 30, projections 54 and 55 are placed against arcuate face 62 as shown in FIG. 10. Projections 54 and 55 "straddle the roll", making two approximately point contacts with arcuate face 62, preventing level 30 from rocking and allowing it to provide an accurate loft measurement on rolled face 62. Attachment 50 is also beneficial in the squaring and face angle procedures shown in FIG. 4 if the face has bulge. In this case, projections 54 and 55 "straddle the bulge" preventing level 30 from rocking and improving the accuracy of these procedures.

CONCLUSION, RAMIFICATIONS, AND SCOPE

Accordingly, the reader will see that the golf club gauge embodiment described uses a single, hand-held electronic level in its squaring and measuring systems, resulting in a gauge which is relatively small, has few parts, and is low in cost to manufacture. The electronic level has a zeroing function, allowing the gauge to be readily portable and usable in various orientations.

Although the description above contains many specificities, these should not be construed as limiting the scope of the invention but as merely providing illustrations of one embodiment. For instance, the gauge could use a level in its measuring system but not its squaring system, and vice versa. The level shown has four measuring sides, but a level with fewer sides would work. Also, gauge positions and configurations are shown which work well for the various procedures described, but others will work. For instance, loft measurements can be made with the gauge in the squaring and face angle position. Thus, the scope of the invention should be determined by the appended claims and their legal equivalents rather than by the examples given.

I claim:

1. An apparatus used to determine loft angle and lie angle of a golf club head, the golf club head having a sole, an arcuate face, and a hosel with an axis, the apparatus comprising:
    a frame having a first planar surface which is a ground plane for the head's sole;
    a clamping means attached to the frame for holding the head in positions relative to the frame with the hosel's axis in a shaft plane which is substantially perpendicular to the ground plane;
    a detachable level having a first planar side with a first edge and a second edge parallel with the first, a second planar side with a first edge and a second edge parallel with the first, and a known angular relationship between the level's first planar side and its second planar side;
    and an attachment which can be placed on the first planar side of the level, the attachment having projections which include a first projection and a second projection which project substantially equal distances from the first planar side of the level when the attachment is placed thereon;
    wherein a first level reading is obtained with a side of the level placed on the frame's first planar surface and a second level reading is obtained with a side of the level placed on the clamping means, whereby information about the head's lie angle is obtained by comparing the first level reading to the second;
    and wherein a third level reading is obtained with a side of the level placed on the frame's first planar surface and, with the first side of the level adapted for use on the arcuate face by having the attachment positioned thereon, a fourth level reading is obtained with the attachment's first and second projections touching the arcuate face at two points and thereby positioning the level's first planar side substantially parallel with a line through the two points on the face, whereby information about the head's loft angle is obtained by comparing the third level reading to the fourth.

2. The apparatus of claim 1 wherein the attachment has a shoulder and when the attachment is placed on the level's first planar side the shoulder is positioned against the first edge of the level's first planar side, whereby the first and second projections are spaced substantially equal distances from the first edge of the level's first planar side.

3. The apparatus of claim 1 wherein the frame has a first support means for positioning the frame in a first position in which the ground plane is substantially horizontal and the shaft plane is substantially vertical and a second support means for positioning the frame in a second position in which the ground plane is substantially vertical and the shaft plane is substantially horizontal, and wherein the frame is in the first position when the information about the head's lie angle is obtained and the information about the head's loft angle can be obtained with the frame in either the first position or the second position.

4. The apparatus of claim 3 wherein the frame has a second planar surface which is substantially perpendicular to the first planar surface and substantially parallel with the shaft plane and, with the frame in the second position, a fifth level reading is obtained with a side of the level placed on the frame's second planar surface and, with the first side of the level adapted for use on the arcuate face by having the attachment positioned thereon, a sixth level reading is obtained with the attachment's first and second projections touching the arcuate face at two points on the face simultaneously with having the edges of the level's first planar side parallel with the ground plane, and information about another property of the golf club head, its face angle, is obtained by comparing the fifth level reading to the sixth.

5. The apparatus of claim 4 wherein the arcuate face has bulge and roll, and when the fourth level reading is obtained, the attachment's projections straddle the roll allowing the level to be stably positioned relative to the face, and when the sixth level reading is obtained, the attachment's projections straddle the bulge allowing the level to be stably positioned relative to the face.

6. The apparatus of claim 1 wherein the attachment can also be placed on the level's second planar side and the third level reading is obtained with the attachment placed on the side of the level which is used to obtain the third level reading whereby an edge of the level's side used to obtain the third level reading is spaced apart from but substantially parallel with the frame's first planar surface.

7. An apparatus used to determine a property of a golf club head, its face angle, the head having a sole, a face, and a hosel with an axis, the apparatus comprising;
    a frame having a first planar surface which is a ground plane for the head's sole, a second planar surface substantially perpendicular to the first planar surface, and an edge which is an intersection of the first planar surface with the second planar surface;
    a clamping means attached to the frame for holding the head in positions relative to the frame with the hosel's axis in a shaft plane which is substantially perpendicular to the frame's first planar surface and substantially parallel with the frame's second planar surface and the frame's edge;
    a first support means for positioning the frame in a first position in which the ground plane is substantially horizontal and the shaft plane is substantially vertical;
    a second support means for positioning the frame in a second position in which the ground plane is substantially vertical and the shaft plane is substantially horizontal;
    and a detachable level having a first planar side with a first edge and a second edge parallel with the first;
    wherein the frame has a base having a first side on which the first planar surface is located, a second side on which the second planar surface is located, a third side having a planar surface substantially parallel with the first planar surface, and a fourth side having a planar surface substantially parallel with the second planar surface, the frame further comprising a riser having a first side with a planar surface substantially parallel with the shaft plane and, attached to the riser's first side, a support leg with a distal end, and the first support means includes the base's third side and the second support means includes the distal end of the support leg and the base's fourth side;
    wherein, with the frame positioned by the second support means in its second position, a first level reading is obtained with the level positioned with the edges of its first planar side parallel with the frame's second planar surface and substantially parallel with the frame's edge and a second level reading is obtained with the level positioned with the first edge of its first planar side parallel with the frame's first planar surface simultaneously with having the second edge of its first planar side parallel with a line through two points on the face of the golf club head;

whereby information about the head's face angle relative to the shaft plane is determined by comparing the first level reading to the second level reading.

8. The apparatus of claim 7 wherein the level is electronic and has a zeroing function, and the zeroing function is used to set the first level reading to zero.

9. The apparatus of claim 7 wherein the head's face has a face line and the information about the head's face angle is used to position the head in the clamping means so that the face line is parallel with the shaft plane, thereby adjusting the head to have a zero face angle relative to the shaft plane.

10. The apparatus of claim 7 wherein, with the frame positioned by the first support means in its first position, a third level reading is obtained with the level's first planar side positioned on the frame's first planar surface with the edges of the level's first planar side substantially parallel with the shaft plane and a fourth level reading is obtained with the level's first planar side positioned on the clamping means with the edges of the level's first planar side substantially parallel with the shaft plane, whereby information about another property of the golf club head, its lie angle, is determined by comparing the third level reading to the fourth.

11. The apparatus of claim 10 wherein the level has a second planar side with a known angular relationship with its first planar side, the level's second side also has a first edge and a second edge parallel with the first, and either side of the level can be used when obtaining any of the level readings.

12. The apparatus of claim 7 wherein the face of the golf club head is arcuate, the apparatus includes an attachment with projections including a first projection and a second projection, and when the second level reading is obtained, the level's first planar side is adapted for use on the arcuate face by having the attachment positioned thereon and the first and second projections are touching the head's arcuate face at two points, whereby the second edge of the level's first planar side is spaced apart from the arcuate face but substantially parallel with a line through the two points on the arcuate face.

13. The apparatus of claim 12 wherein the first and second projections are symmetrically located relative to a center line of the face when the second level reading is obtained.

14. The apparatus of claim 7 wherein the riser also has a second side having a planar surface substantially parallel with the planar surface of the riser's first side and, with the support leg attached to the riser's second side, the apparatus has a third support means which includes the base's second side and the distal end of the support leg.

15. The apparatus of claim 14 wherein, when the frame is in its second position, it is in a position to determine information about the face angle of a right-handed club head, and when the frame is in its third position, it is in a position to determine information about the face angle of a left-handed club head.

16. An apparatus used to determine angular properties of a golf club head, the golf club head having a sole, a face, a hosel with an axis and angular properties of face angle, loft angle, and lie angle, the apparatus comprising:

a detachable level having a first planar side and a second planar side having a known angular relationship with the first side, each planar side having a first edge and a second edge parallel with the first;

and a frame and clamping assembly comprising:

a base having a first side with a first planar surface which is a ground plane for the head's sole, a second side with a second planar surface substantially perpendicular to the first planar surface, a third side, a fourth side, and an edge which is an intersection of the first planar surface with the second planar surface;

a riser having a first side and a second side;

a clamping means attached to the riser for holding the head in positions relative to the frame with the hosel's axis in a shaft plane which is substantially perpendicular to the base's first planar surface and substantially parallel with the base's second planar surface and the base's edge;

a support leg attached to the riser's first side;

a first support which includes the base's third side by which the assembly sits in a first position in which the ground plane is substantially horizontal and the shaft plane is substantially vertical;

and a second support which includes the base's fourth side and the support leg by which the assembly sits in a second position in which the ground plane is substantially vertical and the shaft plane is substantially horizontal;

wherein, with the assembly in its second position, information about the head's face angle relative to the shaft plane can be determined by obtaining a first level reading with either planar side of the level placed on the base's second planar surface, obtaining a second level reading with the level positioned with the first edge of its first planar side against the base's first planar surface simultaneously with having the second edge of its first planar side against the club head's face, and comparing the first level reading to the second;

wherein, with the assembly in its first position, information about the head's lie angle can be determined by obtaining a third level reading with either planar side of the level positioned on the base's first planar surface, obtaining a fourth level reading with either planar side of the level positioned on the clamping means, and comparing the third level reading to the fourth;

and wherein, with the assembly in either its first or its second position, information about the head's loft angle can be determined by obtaining a fifth level reading with either planar side of the level positioned on the base's first planar surface, obtaining a sixth level reading with either planar side of the level positioned on the face, and comparing the fifth level reading to the sixth.

17. The apparatus of claim 16 wherein the base's fourth side has a surface with a first point and a second point, the support leg has a distal end, and the two points on the base's fourth side and the leg's distal end define a support plane which is substantially parallel with the shaft plane and the two points on the base's fourth side and the leg's distal end are included in the second support.

18. The apparatus of claim 16 wherein the apparatus with its assembly in the second position is used to determine angular properties of a right-handed golf club head, and the frame and clamping assembly also has a third support which includes the base's second side and the support leg attached to the riser's second side by which the assembly sits in a third position in which the ground plane is substantially vertical and the shaft plane is substantially horizontal and the apparatus with its assembly in the third position can be used to determine angular properties of a left-handed golf club head.

19. The apparatus of claim 16 wherein the face of the golf club head is arcuate, the apparatus includes an attachment having a first projection and a second projection, and when the level is used to obtain the second level reading, the level's first planar side is adapted for use on the arcuate face by having the attachment positioned thereon, the first and second projections are touching the head's arcuate face at two points, and the second edge of the level's first planar side is thereby spaced apart from the arcuate face but parallel with a line through the two points on the arcuate face, and when the level is used to obtain the sixth level reading, the side of the level used to obtain the reading is adapted for use on the arcuate face by having the attachment positioned thereon, the first and second projections are touching the head's arcuate face at two points, and an edge of the level's side used to obtain the reading is thereby spaced apart from the arcuate face but parallel with a line through the two points on the arcuate face.

* * * * *